(12) United States Patent
Jelinek (10) Patent No.: US 8,860,824 B2
(45) Date of Patent: Oct. 14, 2014

(54) MOTION BLUR MODELING FOR IMAGE FORMATION

(75) Inventor: Jan Jelinek, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 81 days.

(21) Appl. No.: 12/852,299

(22) Filed: Aug. 6, 2010

(65) Prior Publication Data

US 2012/0033096 A1 Feb. 9, 2012

(51) Int. Cl.
*H04N 5/228* (2006.01)
*G06T 5/00* (2006.01)

(52) U.S. Cl.
CPC ....... *G06T 5/003* (2013.01); *G06T 2207/20201* (2013.01)
USPC ...................................... 348/208.14; 348/367

(58) Field of Classification Search
USPC ............... 348/208.12, 208.13, 208.14, 208.4, 348/362, 363, 367, 208.6, 222.1
See application file for complete search history.

(56) References Cited

U.S. PATENT DOCUMENTS

| | | | |
|---|---|---|---|
| 7,440,634 B2* | 10/2008 | Ben-Ezra et al. | 382/255 |
| 7,557,832 B2* | 7/2009 | Lindenstruth et al. | 348/208.99 |
| 7,580,620 B2* | 8/2009 | Raskar et al. | 396/55 |
| 7,619,656 B2* | 11/2009 | Ben-Ezra et al. | 348/208.4 |
| 2005/0047672 A1 | 3/2005 | Ben-Ezra et al. | |
| 2006/0093233 A1* | 5/2006 | Kano et al. | 382/254 |
| 2006/0098890 A1* | 5/2006 | Steinberg et al. | 382/255 |
| 2006/0119710 A1 | 6/2006 | Ben-Ezra et al. | |
| 2009/0079836 A1 | 3/2009 | Mishima et al. | |

OTHER PUBLICATIONS

Search Report from related EP Application No. 11175884.3-2218, mailed Jan. 19, 2012 (3 pgs.).

* cited by examiner

*Primary Examiner* — Lin Ye
*Assistant Examiner* — Chriss Yoder, III
(74) *Attorney, Agent, or Firm* — Brooks, Cameron & Huebsch, PLLC (57) ABSTRACT

The present disclosure includes motion blur modeling methods and systems for image formation. One motion blur modeling method for image formation includes obtaining image data utilized to form a particular image taken by a camera of a subject, obtaining velocity vector data for the subject at the time the image was taken, defining a convolution kernel for use formation of the particular image and based upon the velocity vector data, and applying the convolution kernel to the image data to produce a de-blurred set of image data utilized to form the particular image.

15 Claims, 7 Drawing Sheets

MOTION BLUR MODELING FOR IMAGE FORMATION

GOVERNMENT RIGHTS

The subject matter of this disclosure was made with government support under Government Contract Number W91CRB-09-C-0013. Accordingly, the U.S. Government has certain rights to subject matter disclosed herein.

BACKGROUND

The present disclosure is related generally to the field of image formation. More particularly, the present disclosure is related to motion blur modeling for image formation.

When a subject (i.e., an item within the frame of view of the camera) is in motion, motion blur can act on an image captured by the camera like a two dimensional low pass filter, whose spatial frequency characteristic depends both on the trajectory of the relative motion between the scene and the camera and on the velocity vector variation along it. Such issues are particularly relevant in the fields of forensic and security applications where clarity of the image can be highly important.

With the growing availability of supercomputing capabilities on graphic video cards and computing devices, the processing of light need not be all done by mechanical components such as lenses and/or mirrors, but some of this functionality can be performed computationally. However, computational optics can only be as good as the developed mathematical models.

If the models are accurate, then there is no functional difference between the physical and computational optics besides the computation time. However, the mathematical models to capture such motion without blur have not yet been created especially for dynamic, moving image formation.

For example, since current sensors can measure only the energy of light waves, but not their phase, all phenomena having to do with the wave nature of light, like interference and diffraction, cannot be simulated. Mathematical theory can calculate these phenomena, but as yet data has not been able to be provided for its computational applications. Currently, computations are largely limited to the phenomena that can be explained by geometric optics.

DETAILED DESCRIPTION

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As the quality of computational image formation can be linked to the accuracy of the knowledge of the physical process that formed the image and thus gave rise to its blur, the embodiments of the present disclosure utilize information about the movement of the subject of the image to adjust the image data to improve any blur that may be present in the image data. As used herein, the subject of an image can be any item captured in an image whether the item is in the foreground or background of the image.

For example, it may be the case that an image is captured of a concourse full of people at an airport, that there may be many people in the foreground of the image, and that a person in the upper corner of the background of the image is the person of interest. For purposes of the present disclosure, any item captured in such an image could be the subject.

The embodiments of the present disclosure may be utilized with any suitable system having any suitable number of devices for providing the system embodiments claimed or performing the method embodiments claimed. Two such examples are illustrated in FIGS. 1 and 2.

Figure 1:
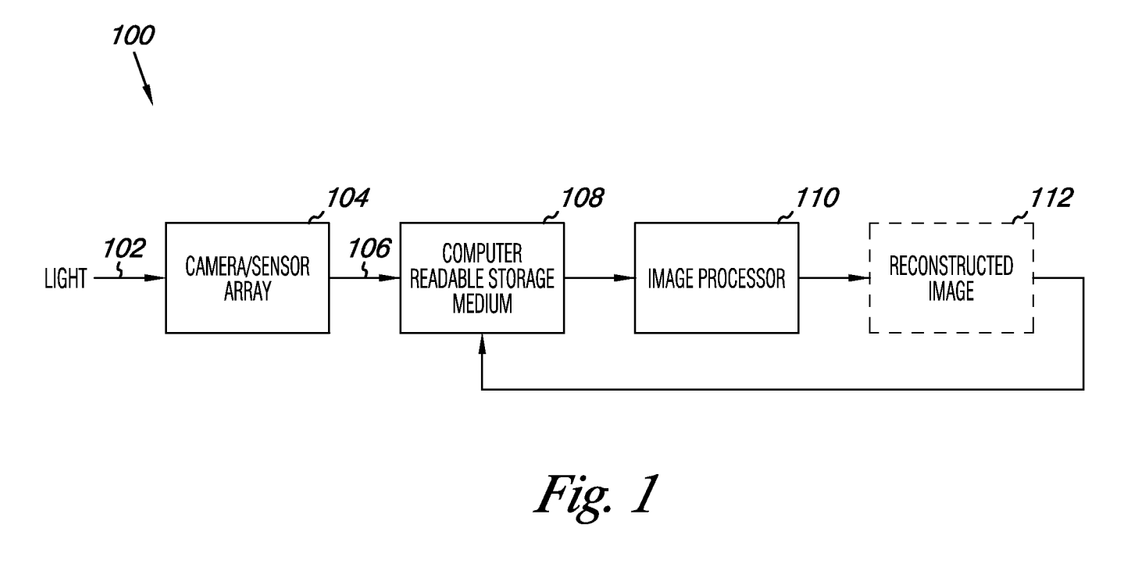
FIG. 1 illustrates a system embodiment of the present disclosure.
Figure 2:
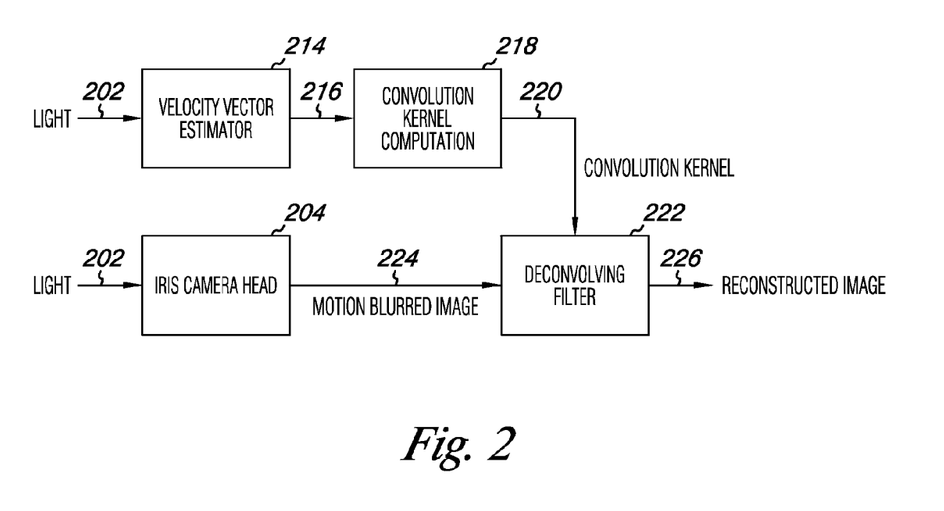
FIG. 2 illustrates another system embodiment of the present disclosure.

FIG. 1 illustrates a system embodiment of the present disclosure. In the embodiment of FIG. 1, the system 100 includes a camera/sensor array 104 that captures an image of the incoming light 102.

In some embodiments, as illustrated in the embodiment of FIG. 1, the captured image data 106 can be transferred to a computer readable storage medium 108. An image processor 110 can be utilized to reduce or remove blur using a number of processes including the process discussed in the present disclosure to alter the image data received from the camera/sensor array 104.

In such a process, the image processor can, for example, obtain the image data from the camera/sensor array 104 or from computer readable storage medium 108. The image processor 110 can be utilized to form an image taken by a camera/sensor array 104 or from another imaging device in communication with the processor.

The image processor 110 produces a reconstructed image based upon the captured image data 106. This can be accomplished by obtaining velocity vector data for the subject at the time the image was taken, converting the velocity vector data into equations of motion for the subject, using the equations to compute a convolution kernel, defining a convolution kernel, as described in more detail below, for use in formation of the image and based upon the velocity vector data, and applying the convolution kernel to the image data to produce a de-blurred set of image data utilized to form the particular image.

Convolution is an operation in which the finalized pixel is the weighted sum of the neighboring pixels. Such a convolution operation can, for example, be based on a matrix which gives some weight to each one of the neighboring pixels. This matrix is called the convolution kernel.

For example, a matrix may be a square that is 3 pixels×3 pixels, 5×5, or 7×7, among other arrangements. Convolution kernels can be any suitable shape. For example, suitable shapes include square, rectangular, or more complicated shapes as may be desired.

As used in the present disclosure, a camera can be a mechanical camera or a camera made of one or more imaging sensors. For example, the sensors can be an array of sensors and can be laid out in a grid pattern among other suitable patterns. If the array is a two dimensional array, the surface of the sensors can be referred to as a sensor plane. In some embodiments, the camera can include a mechanical camera and a digital converter to convert the image to data. In various embodiments, the camera can be a flutter shutter type camera.

With respect to obtaining velocity vector data, this data can come from any suitable source. Examples of suitable sources include multiple images of the subject from the same camera taken at different times, multiple images of the subject from a second camera taken at different times, but substantially the same time as at least one image take from the first camera, images from a video camera, images of the subject at a different time than the time when the image from the first camera is taken, data from one or more motion sensors, and other such sources.

It is beneficial to have data obtained from the actual movement taking place in the image being formed as it is most closely related to the actual motion. However, if that data cannot be obtained, it may still be beneficial to utilize data obtained previously or from a different location with respect to the first camera as a similar motion may be observed or the motion may be identified from the different location.

FIG. 2 illustrates another system embodiment of the present disclosure. In the embodiment of FIG. 2, the system includes an iris camera head 204, a velocity vector estimator 214 that both receive light 202.

In the embodiment of FIG. 2, the iris camera head 204 captures the image data in the field of view of the camera. This image data will be used to form the de-blurred image of a subject in the image (e.g., a portion or the entire image that was captured.

The velocity vector estimator 214 analyzes the light received to determine a velocity vector, at a particular time, of a subject in the image it receives. The velocity vector estimator generates velocity vector data 216, preferably, for the subject at the time the image was taken. The velocity vector data 216 is provided to a processor that performs the convolution kernel computation 218.

In some embodiments, the velocity vector estimator functionality and the convolution kernel computation functionality can be performed by the same processor. A processor as used herein can process data and/or executable instructions via hardware, software, firmware, or a combination of these.

In some embodiments, the velocity vector data indicates the velocity is changing over time. This can be ascertained in any suitable way. For example, the velocity can be identified through viewing multiple images as discussed herein and likewise, the change in velocity can also be ascertained in a similar manner in some embodiments.

In various embodiments, depending on the complexity of the relative motion between the object in the scene being studied and the camera the velocity data can be recorded in the form of one dimensional for motion along a straight line or two dimensional arrays for general motions. At the end, the estimated velocity vectors are used to produce parametric equations of the observed motion, which serve as the standard motion description input for the convolution kernel computational algorithm according to the present disclosure.

Figure 3:
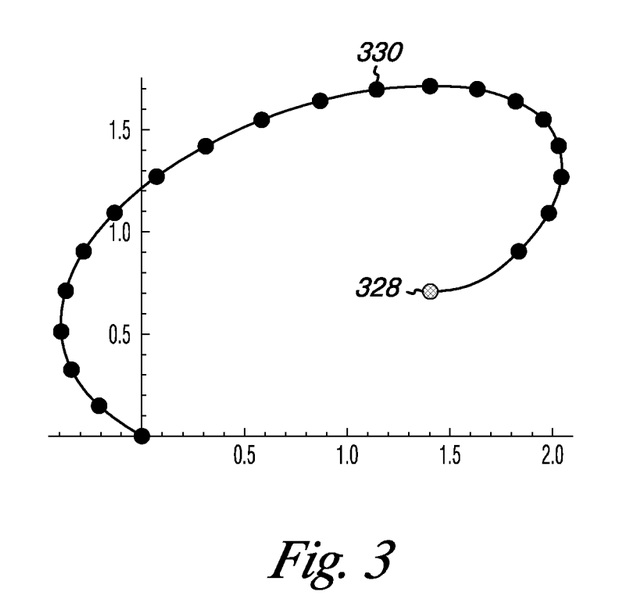
FIG. 3 illustrates a motion trajectory for use with an embodiment of the present disclosure.
Figure 4:
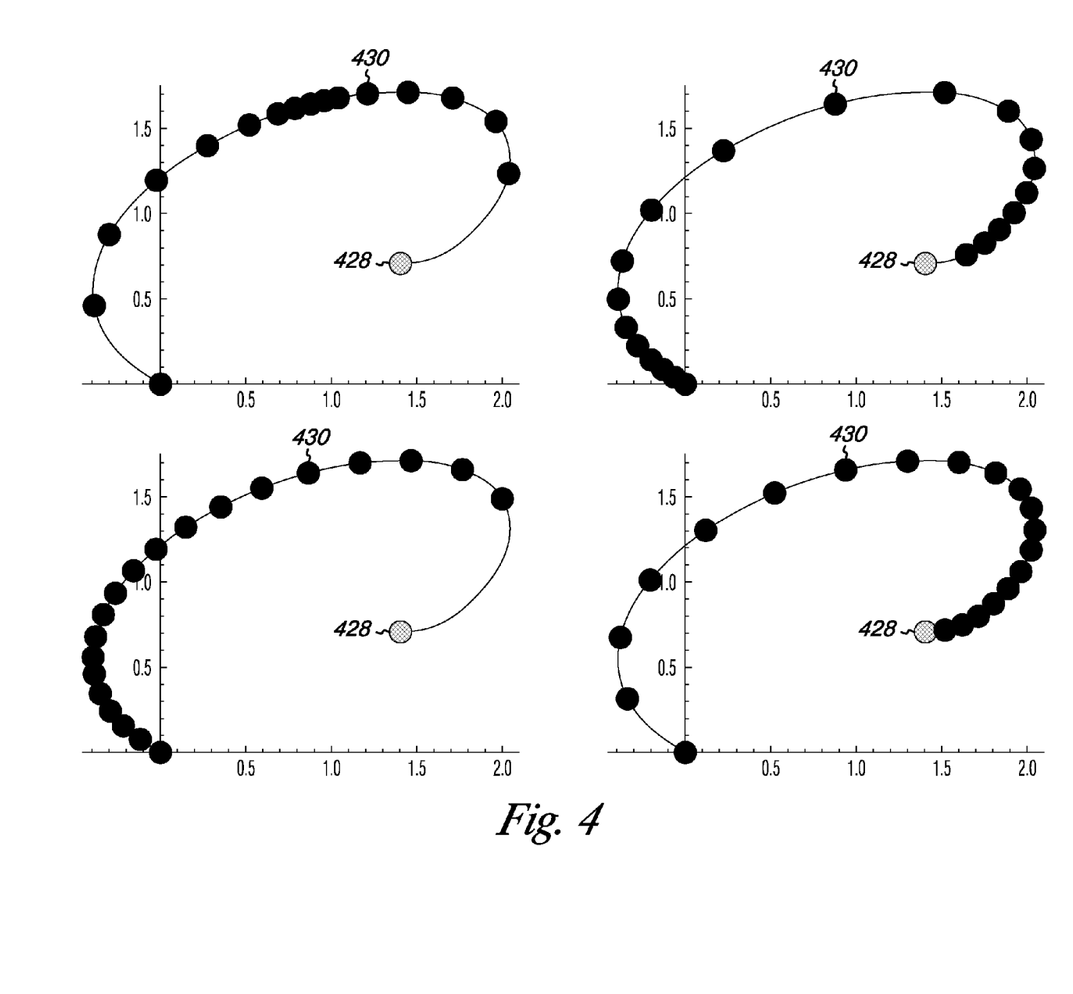
FIG. 4 illustrates examples of motion trajectories that illustrate how the same path can be traveled at different velocity profiles.

Examples of the graphical depiction of motion trajectories described by the equations are shown in FIGS. 3 and 4. In all five cases, the relative motion traces the same trajectories. However, they are traveled following different time schedules as the motion locally accelerates or decelerates, as it can be inferred from the varying density of dots, which represent clock ticks. Consequently, in spite of sharing the same paths, the cases represent five different kinds of motion, and observing each would result in different sets of velocity vectors.

Additionally, in various embodiments, memory can be utilized for the storage of image data and/or velocity vector data. Memory as used herein can be any form of memory suitable for storing data, and in some embodiments, executable instructions and data. Suitable examples of memory include physical volatile and non-volatile memory types.

In some embodiments, the processor and memory can reside in the same device, such as a computing device. In various embodiments, the processor and memory are located on separate devices. Such devices can be directly connected or connected via a network.

The convolution kernel computation can be accomplished, for example, via an image processor which can define the convolution kernel for use in formation of a particular image, based upon the velocity vector data. This convolution kernel can be applied to the motion blurred image 224 as a deconvolving filter 222 to produce a de-blurred set of image data utilized to form the particular image (e.g., reconstructed image 226). As used herein de-blurred includes images that have reduced blurring or no blurring as compared to the originally captured image.

When a subject is not moving, the image recorded in each pixel is light from one particular portion of the actual subject. However, when a subject is moving, the light contacting a pixel may be from different portions of the subject as the subject moves and its light is received by different pixels. For example, the reader may be able to understand this concept by visualizing an image plane, which is the light pattern projected on the sensor plane at a particular point in time.

This image plane can be thought of as sliding with respect to the sensor plane as the subject moves. In such an example, the reader should be able to understand that a portion of the image plane that would correspond to a particular pixel may not correspond with it as the subject moves and that another non-corresponding image portion may then be in contact with that pixel.

As the image plane moves with respect to the sensor plane over time, any point on the sensor plane can be successively visited by many points of the image plane. Each visit by a non-corresponding point provides a component that blurs the image.

However, if the motion of the subject can be identified, then the component of the image that is not corresponding to its correct pixel can not only be removed, but also properly attributed to where it belongs so no light energy is lost in the image reconstruction process. As disclosed herein, embodiments of the present disclosure can provide such functionality.

For example, FIG. 3 illustrates a motion trajectory for use with an embodiment of the present disclosure. The motion data illustrated as a trajectory can be identified based upon the motion information provided about the image being captured (e.g., velocity vector data).

In the embodiment of FIG. 3, the motion of the subject of the image captured has been determined to move from a starting point 328 through a number of other points 330 along a path forming a motion trajectory over a period of time (each point occurs at a different point in time). In this example, the relatively uniform spacing of the dots indicates that the velocity of the motion is substantially constant. In the illustration of FIG. 3, time is one component of the arrangement of the dots, along with velocity, and direction as other components.

FIG. 4 illustrates examples of motion trajectories that illustrate how the same path can be traveled at different velocity profiles. In the illustration of FIG. 4, four trajectories are shown. These embodiments illustrate that although the starting points 428 are the same and the trajectories are the same, the velocities change along different parts of the trajectory. These changes can affect the influence a particular component may have on a pixel. For example, if a component passes through a pixel quickly (e.g., the dots are more spaced apart), it will have less influence on the pixel than a component passing through more slowly (e.g., the dots are closer together).

Figure 5:
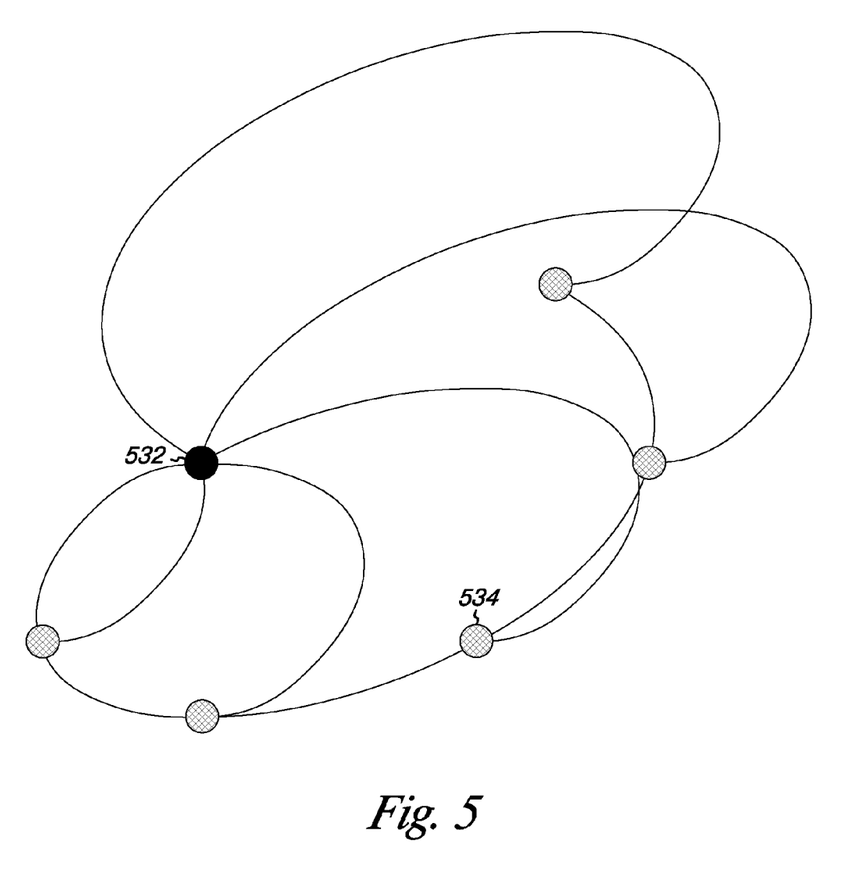
FIG. 5 illustrates a source curve for use with an embodiment of the present disclosure.

FIG. 5 illustrates a source curve for use with an embodiment of the present disclosure. The source curve is a locus of image plane points that contribute their light energy to a particular point within a pixel. No other points in the image plane ever pass over the point. In the previous figures, the trajectory of the movement of the image was shown.

In the illustration of FIG. 5, segments of trajectories for five arbitrarily selected points (534 is one of them) at the source curve show how the points move to eventually pass over the studied pixel 532. The dots do not represent pixels; they are graphically exaggerated depictions of points in the image or in a pixel.

In the illustration of FIG. 5, dot 532 is the anchor point within the particular pixel being analyzed and dots 534 are the starting points at which a component will start which will affect the particular pixel. In this way, the data of each individual pixel can be adjusted based upon this interaction of the components and as such, certain portions of the image may be adjusted rather than the whole image if it is desirable to do so.

As can be ascertained from the illustration of FIG. 5, a unique source curve is associated with each point in the sensor array based upon the components that will affect the portion of the image that is captured within that particular pixel. As noted above the source curve is not a trajectory, but the locus of points, from which the anchor point can be reached along a motion trajectory shorter than the period of time of exposure (e.g., from shutter opening to closing or a particular time period). This time parameter can be referred to as the time to anchor for each component 534.

Of all of the points in the image plane, only those making up the source curve pass over the anchor point during the time period (e.g., shutter opening). Each of the source curve points does so at a different point in time, arrives along its own path, and passes over the anchor point at its own speed.

The paths shown in FIG. 5 illustrate the motion of the source curve points 534 as they are approaching the anchor point 532 they share. It should be noted that the image irradiances along the paths do not contribute to the irradiance of the particular pixel, but only the irradiance of the end points 534 on the source curve contribute. Vector data associated with an image can be identified from this type of source curve analysis as will be described with respect to the figures herein.

Figure 6:
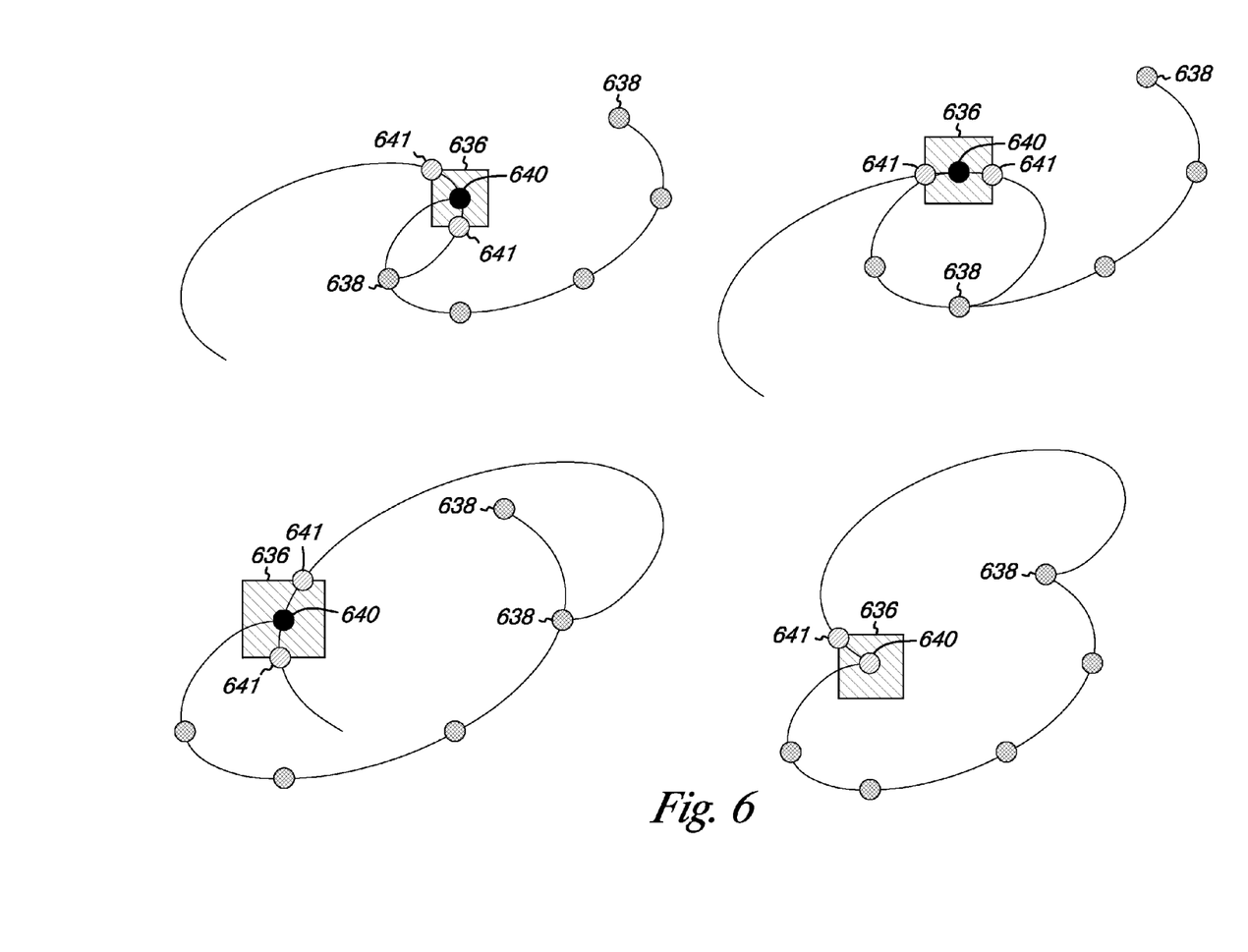
FIG. 6 illustrates an image formation process for use with an embodiment of the present disclosure.

FIG. 6 illustrates an image formation process for use with an embodiment of the present disclosure. In the illustration of FIG. 6, a pixel 636 is shown with an anchor point 640 within the pixel 636 and the paths of a number of components 638 that affect the pixel are shown on the different illustrations.

In physics, the concept of power is defined as the time derivative of the energy, $$P(t) = \frac{dE(t)}{dt}.$$

Technically, power is just a synonym for the energy density distribution along the time axis. The energy, however, may be also be distributed in space, $$P(x) = \frac{dE(x)}{dx},$$

or even both in time and space, $$P(x, t) = \frac{\partial^2 E(x, t)}{\partial x \partial t}.$$

Of course, the space may have more than one dimension which those of skill in the art would understand would change the above equation.

From the physical perspective, image projected on the sensor surface is a 2D distribution of irradiance ir(x, y, t). Irradiance is the unit of the light power density, measured in $\lfloor Wm^{-2} \rfloor$. In the light of the previous categorization, for this illustration, the irradiance is the energy distribution of light both over the 2D space X×Y and time T.

Therefore, the amount of collected energy is the triple integral of the irradiance over the Cartesian product of the collection area, X×Y, and the exposure, T, $E = \iiint_{X \times Y \times T} ir(x,y,t) dxdydt$. While conceptually simple, computing the integral becomes complicated when the projected irradiance pattern is moving relative to the sensor pixels.

With regard to the illustration of FIG. 6, during the (exposure time for the pixel (e.g., shutter opening), all points 638 on the source curve will sooner or later arrive at the anchor dot 640, each depositing there its chunk of the energy proportional to its irradiance $ir(sF(T|\{x_s,y_s\}))$, $0 \leq T \leq T_x$. The function $sF(T|\{x_s,y_s\})$ is the parametric description of the source curve and can be constructed from the equations of image motion.

However, the irradiance of the dots 638 alone is not all that has to be identified. The exposure of each dot 638 to the anchor dot 640 also matters. It is not given by the exposure time (e.g., time the camera shutter is open) as in the conventional imaging, but by the residence time each dot 638 (="source of energy") spends within the pixel 636 to which the anchor dot 640 belongs. To explain this generalized concept of exposure, let us turn our attention to FIG. 6.

In the illustration of FIG. 6, the energy collected by the pixel 636 is independent on what other pixels of the sensor collect. This is emphasized in this figure by not showing any other pixels. Furthermore, each point of the source curve takes a different fragment of the trajectory (e.g., trajectory illustrated in FIG. 3) and thus time to traverse the pixel 636. The fragments' end points for traversing the pixel are marked by the dots 641 at the edges of the pixel 636.

The box 636 in FIG. 6 represents a "real" pixel of the sensor array. It is "real" in the sense that it has possibly small, but nevertheless finite dimensions (that is, the pixel is not an infinitesimal object). The pixel 636 (or, rather, its potential well) serves as an accumulator, where the chunks of energy carried by those parts of the image that happen to pass over it during the shutter opening, are deposited.

With regard to the illustration in FIG. 6, it may be helpful to give a physical interpretation. As the image plane is sliding over the sensor plane tracing the motion trajectory, different component dots 638 on the source curve eventually enter the pixel 636 and reach their anchor dot 640. However, except for just one trajectory, whose arrival time is T=Ts, they will not stop at the anchor dot 640, but rather, will continue on until they either exit the pixel 636 or stop somewhere within it if the exposure time ends (e.g., shutter closes) before they manage to exit pixel 636.

Paths originating at the source curve not only enter and exit the pixel 636 at different points, but also can move across it at different velocities, in some embodiments. Due to different velocities, the residence time spent inside the pixel 636 is not necessarily equivalent to the length of the trajectory fragment within the pixel 636.

Consequently, each of the component dots 638 may have a different residence time within the pixel 636. In contrast to the conventional, static imaging, exposure in dynamic imaging embodiments of the present disclosure is no longer a global concept, but a private relationship between a point in the image and a pixel that is independent of the length of the shutter opening. In such embodiments, the convolution kernel can be applied to the data of each individual pixel of the image data.

Figure 7:
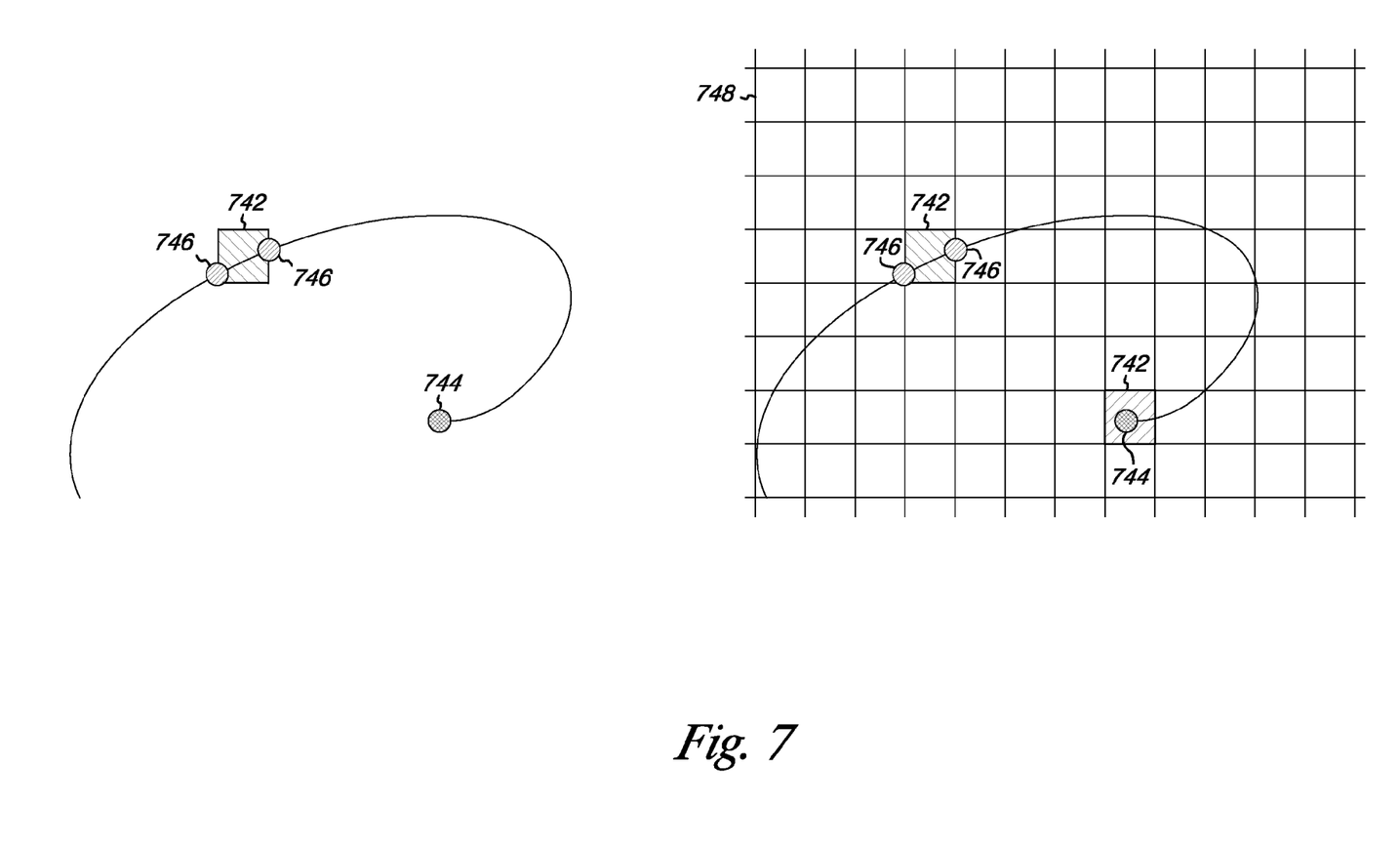
FIG. 7 illustrates an image formation process in the time domain for use with an embodiment of the present disclosure.

FIG. 7 illustrates an image formation process in the time domain for use with an embodiment of the present disclosure. The left illustration provides a continuous model and the right illustration provides a discretized model with a grid 748 overlaid to illustrate the pixels 742 of the sensor plane.

Consider an infinitesimal area dxdy in the image. In FIG. 7, for illustration purposes, the area is depicted by a large dot 744 and not as a dimensionless point. If the image were static, energy is collected in it for dt seconds, and the point will harvest ir(x,y,t)dxdydt Joules of energy. In dynamic imaging, however, the collection takes place when the component dot 744 arrives at the pixel 742 and starts moving through it. If the dot enters at the time $t_0$ and exits at $t_1$, the total energy contribution to the pixel 742 provided by the component dot 744 is $\int_{t_0}^{t_1} ir(x,y,t)dxdydt$.

However, as we have discussed above, the component dot 744 provided at the location (x, y) is not the only portion of the image to move over the pixel 742. To obtain the total energy collected by the pixel 742 contributions of all points on the source curve in the image have to be added. Since different points generally have different entry and exit times, the integration bounds will be functions of their location $$E = \int \int_{X \times Y} \left( \int_{t_0=f(x,y)}^{t_1=g(x,y)} ir(x, y, t)dt \right) dx\, dy$$

The area integral is taken over the entire image. Since the directions x and y are orthogonal in images, the double integral can be converted into iterated Riemann integrals with independent bounds $$E = \int_{x_0}^{x_1} \left( \int_{y_0}^{y_1} \left( \int_{t_0=f(x,y)}^{t_1=g(x,y)} ir(x, y, t)dt \right) dy \right) dx$$

where the rectangle $\langle x_0, x_1 \rangle \times \langle y_0, y_1 \rangle$ stands for the image. Since, by assumption, the scene is not changing in time, ir(x, y, t)=ir(x, y), which allows the above formula to be rewritten as $$E = \int_{x_0}^{x_1} \left( \int_{y_0}^{y_1} ir(x, y) \left( \int_{t_0=f(x,y)}^{t_1=g(x,y)} dt \right) dy \right) dx =$$

$$\int_{x_0}^{x_1} \left( \int_{y_0}^{y_1} ir(x, y)(g(x, y) - f(x, y))dy \right) dx$$

The function in the integrand ex(x,y)=$t_1 - t_0$=g(x,y)−f(x,y)

can be referred to as the exposure function and its function value can be referred to as the exposure of the image point {x, y} to the pixel 742. Note that pixel size and coordinates are present in the equation only implicitly in the shape of the functions f and g. With it, the final form of the formula for computing the amount of energy collected by the pixel reads $E=\int_{x_0}^{x_1}(\int_{y_0}^{y_1}ir(x,y)ex(x,y)dy)dx$ An exposure function should also be formulated and provided below is an example as to how that can be accomplished. There is no closed form formula that would return the exposure value for a given point after plugging in its coordinates. Further, the intersection times, $t_i$, when the trajectory tF intersects one of the pixel edges, are defined implicitly as the solutions of the four equations $tF_1(t_i|\{x,y\},0)=x_L^p$ $tF_1(t_i|\{x,y\},0)=x_R^p$ $tF_2(t_i|\{x,y\},0)=x_T^p$ $tF_2(t_i|\{x,y\},0)=x_B^p$ A pixel (=area in the sensor plane) can be described by the quadruple p={$x_L, x_R, x_T, x_B$} of its left, right, top, and bottom edge coordinates, and use the superscript p to distinguish the pixel. The set of equations above may have no solution, if a component path does not intersect the pixel, in which case ex(x, y)=0.

If the path does intersect the pixel, then there usually are two solutions, one for the entry point and the other for the exit point (points 746). It may also have just one solution determining either the entry or exit point, if the trajectory originates or ends within the pixel. It may even have more than two solutions, if a trajectory weaves in and out repeatedly before it either sets out for a definitive departure or eventually terminates inside the pixel.

The integral $E=\int_{x_0}^{x_1}(\int_{y_0}^{y_1}(ir(x,y)ex(x,y)dy)dx$ described above does not actually have to be computed, because each pixel in a sensor array evaluates its own integral by virtue of its operation. However, the image formation model as described by this equation may be useful, for example, in being able to compute what would actually be measured on the pixel if desired.

One potential shortcoming is that it is not invertible. It allows computing the energy collected by each pixel in the sensor, which represents the "image intensity". However, it does not allow going in the opposite direction to compute the irradiance function ir(x, y) from a given digitized image produced by a digital camera. This is because the amount of information that can be recovered cannot exceed the amount of information present in the imperfect camera image, the first constraint is that we cannot compute the irradiance function values at more points than there are pixels in the camera sensor.

In an attempt to build an invertible model, values may be chosen, for example, in a manner as follows. The original image is partitioned into N tiles of the same size as the pixels in our sensor. A tile is like a pixel except that it is an image plane object (a portion of the image to be captured).

The 2D irradiance profile over each tile is replaced by the average irradiance over it. Then consider if this new, piece-wise constant "approximation" image containing only N distinct irradiance values is projected onto the sensor surface (the grid in the right panel of the FIG. 7 is to be understood as the tiling of the image, not the sensor pixels). The grid should be viewed not as physical boundaries, but as lines of discontinuity in the image that are placed on the image for the purposes of potentially creating an invertible model.

Assume that the sensor array has I rows and J columns and denote the area of the (i, j)-th pixel as the rectangle $\langle x_{i-1}, x_i \rangle \times \langle y_{j-1}, y_j \rangle$. Then $E = \int_{x_0}^{x_1} (\int_{y_0}^{y_1} ir(x,y) ex(x,y) dy) dx$ can be rewritten as $$E = \int_{x_0}^{x_1} \left( \int_{y_0}^{y_1} ir(x, y) ex(x, y) dy \right) dx =$$

$$\sum_{i=1}^{I} \sum_{j=1}^{J} \int_{x_{i-1}}^{x_i} \left( \int_{y_{j-1}}^{y_j} ir(x, y) ex(x, y) dy \right) dx$$

Replacing the actual irradiance profile over the (i, j)-th tile by its average ir(i, j) (actually, as the theory of the Riemann integral provides, choosing any irradiance value occurring within the tile will work for small tiles) an estimate, $\hat{E}$, is obtained of the actual energy, E $$\hat{E} = \sum_{i=1}^{I} \sum_{j=1}^{J} ir(i, j) \int_{x_{i-1}}^{x_i} \left( \int_{y_{j-1}}^{y_j} ex(x, y) dy \right) dx$$

In order to evaluate the iterated integrals inside, they can be replaced by the Riemann sums $$\hat{E} = \sum_{i=1}^{I} \sum_{j=1}^{J} ir(i, j) \sum_{m=1}^{M} \sum_{n=1}^{N} ex(m, n \mid i, j).$$

The double sum over M, N represents the summation over all the subintervals onto which each tile was partitioned.

The formula reveals that as a result of motion during exposure, individual tiles in the image do not contribute evenly to the energy total collected by a pixel. The irradiance ir(i, j) of (i, j)-th tile can be seen as scaled down by the weight $$w(i, j) = \sum_{m=1}^{M} \sum_{n=1}^{N} ex(m, n \mid i, j)$$

in the energy total $$\hat{E} = \sum_{i=1}^{I} \sum_{j=1}^{J} ir(i, j) w(i, j).$$

The weights suitably arranged into a matrix constitute the convolution kernel.

The above formula $\hat{E}$ for is computationally inefficient, because it runs over all tiles I×J, even though many, if not most for larger kernels, do not pass over the anchor pixel and thus cannot contribute. This inefficiency can be avoided by reformulating the formula using the source curve. The new formula reads $$\hat{E} = \sum_{m=1}^{M} \sum_{n=1}^{N} \sum_{k=1}^{K=f(M,N)} ir(k)(T_k - T_{k-1})$$

where K is the number of pixels that are crossed by the source curve. It is assumed that the pixels are suitably ordered and then indexed by k.

Computing the times, $T_k$, determining the intersection points of the source curve with the tile grid involves solving the following equations $$sF_1(T_i | \{x_s, y_s\}) = x_L^g$$

$$sF_1(T_i | \{x_s, y_s\}) = x_R^g$$

$$sF_2(T_i | \{x_s, y_s\}) = y_T^g$$

$$sF_2(T_i | \{x_s, y_s\}) = y_B^g$$

In such an embodiment, the reformulation also reduces the size of the kernel from that of the image to a rectangle that encloses the source curve only.

As will be understood by those of skill in the art, the information regarding the energy provided to the pixel can be beneficial in forming the convolution kernel and thereby reducing the amount of blur in an image as discussed in the method and system embodiments provided in the present disclosure.

As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present invention and are not to be used in a limiting sense.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

As used herein, the term "and/or" includes any and all combinations of one or more of the associated listed items. It will be understood that, although the terms first, second, etc. may be used herein to describe various elements and that these elements should not be limited by these terms. These terms are only used to distinguish one element from another element. Thus, a first element could be termed a second element without departing from the teachings of the present disclosure.

It is to be understood that the use of the terms "a", "an", "one or more", "a number of", or "at least one" are all to be interpreted as meaning one or more of an item is present. Additionally, it is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A motion blur modeling method for image formation, comprising:
   obtaining image data utilized to form a particular image taken by a camera of a subject;
   obtaining, from a source curve, velocity vector data for the subject at the time the image was taken by identifying a residence time of a point along the source curve, wherein:
      the residence time of the point along the source curve is an amount of time the point spends within a particular pixel; and
      the source curve is a locus of a plurality of points in an image plane, corresponding to a single pixel of the image, wherein at least one of the plurality of points has a trajectory that passes over another one of the plurality of points in the single pixel;
   defining a convolution kernel for use formation of the particular image and based upon the velocity vector data; and
   applying the convolution kernel to the image data to produce a de-blurred set of image data utilized to form the particular image.

2. The method of claim 1, wherein the camera is an array of sensors.

3. The method of claim 2, wherein a unique source curve is associated with each point in the sensor array.

4. The method of claim 1, wherein defining a convolution kernel for use formation of the particular image and based upon the velocity vector data includes a time component that is the time to an anchor point.

5. An image formation system, comprising:
   a camera for capturing image data utilized to form a particular image taken by a camera of a subject;
   a velocity vector estimator for identifying a velocity vector and generating, from a source curve, velocity vector data for the subject at the time the image was taken by identifying a residence time of a point along the source curve, wherein:
      the residence time of the point along the source curve is an amount of time the point spends within a particular pixel; and
      the source curve is a locus of a plurality of points in an image plane, corresponding to a single pixel of the image, wherein at least one of the plurality of points has a trajectory that passes over another one of the plurality of points in the single pixel;
   memory for the storage of at least one of image data and velocity vector data;
   an image processor for defining a convolution kernel for use in formation of the particular image and based upon the velocity vector data and applying the convolution kernel to the image data to produce a de-blurred set of image data utilized to form the particular image.

6. The image formation system of claim 5, wherein the camera is a shutter flutter camera.

7. The image formation system of claim 5, wherein the camera is a digital camera.

8. The image formation system of claim 5, wherein the velocity vector estimator is a motion sensor.

9. The image formation system of claim 5, the velocity vector estimator is a second camera.

10. The image formation system of claim 5, wherein the memory and image processor are in a computing device.

11. The image formation system of claim 5, wherein the memory and image processor are in communication via a network.

12. A non-transitory computer readable medium having computer-executable instructions stored thereon for execution by a processor to provide a motion blur modeling method for image formation, the method including:
   obtaining image data utilized to form a particular image taken by a camera of a subject;
   obtaining, from a source curve, velocity vector data for the subject at the time the image was taken by identifying a residence time of a point along the source curve, wherein:
      the residence time of the point along the source curve is an amount of time the point spends within a particular pixel; and
      the source curve is a locus of a plurality of points in an image plane, corresponding to a single pixel of the image, wherein at least one of the plurality of points has a trajectory that passes over another one of the plurality of points in the single pixel;
   defining a convolution kernel for use formation of the particular image and based upon the velocity vector data; and
   applying the convolution kernel to the image data to produce a de-blurred set of image data utilized to form the particular image.

13. The method of claim 12, wherein defining a convolution kernel for use formation of the particular image and based upon the velocity vector data includes a time component.

14. The method of claim 12, wherein defining a convolution kernel for use formation of the particular image and based upon the velocity vector data wherein the velocity vector data indicates the velocity is changing over time.

15. The method of claim 12, wherein defining a convolution kernel for use formation of the particular image and based upon the velocity vector data utilizes two dimensional velocity vector data.

* * * * *